United States Patent
Lu et al.

(10) Patent No.: US 6,299,340 B1
(45) Date of Patent: Oct. 9, 2001

(54) FEEDING APPARATUS AND METHOD IN SPIRAL ENGAGEMENT OF EXTRUDER

(76) Inventors: Baiyuan Lu; Yanchang Liu; Pengzhen Liu, all of No. 53 Zhengzhou Road, Qingdao City, Shandong Province, 266042 (CN)

( * ) Notice: Subject to any disclaimer, the term of this patent is extended or adjusted under 35 U.S.C. 154(b) by 0 days.

(21) Appl. No.: 09/486,980

(22) PCT Filed: Sep. 3, 1998

(86) PCT No.: PCT/CN98/00180

§ 371 Date: Mar. 2, 2000

§ 102(e) Date: Mar. 2, 2000

(87) PCT Pub. No.: WO99/11450

PCT Pub. Date: Mar. 11, 1999

(30) Foreign Application Priority Data

Sep. 3, 1997 (CN) .................................... 97106074

(51) Int. Cl.⁷ ....................................................... B29B 7/60
(52) U.S. Cl. .............................. 366/76.3; 366/85
(58) Field of Search .................. 366/76.3, 76.4, 366/83–85, 158.1, 301; 425/204, 208, 209

(56) References Cited

U.S. PATENT DOCUMENTS

| 1,977,515 | * | 10/1934 | Klippel . |
| 2,441,222 | * | 5/1948 | Fuller . |
| 2,581,451 | * | 1/1952 | Sennet . |
| 2,592,476 | * | 4/1952 | Sennet . |
| 2,693,762 | * | 11/1954 | Sennet . |
| 3,078,511 | * | 2/1963 | Street . |
| 3,085,288 | * | 4/1963 | Street . |
| 3,203,370 | * | 8/1965 | Haug et al. . |
| 3,310,837 | * | 3/1967 | Wittrock . |
| 3,744,770 | * | 7/1973 | Ocker et al. . |
| 3,749,374 | * | 7/1973 | Buchheit . |
| 3,929,322 | * | 12/1975 | Hanslik . |
| 3,929,323 | * | 12/1975 | Smith . |
| 4,025,058 | * | 5/1977 | Mizuguchi ............................ 425/204 |
| 4,268,176 | * | 5/1981 | Muller .................................... 366/83 |
| 4,723,901 |   | 2/1988 | Sarumaru . |
| 4,764,020 | * | 8/1988 | Moriyama ............................. 366/85 |
| 4,773,763 | * | 9/1988 | Weber .................................... 366/83 |
| 4,786,180 |   | 11/1988 | Chszaniecki et al. . |
| 4,877,390 | * | 10/1989 | Ocker et al. .......................... 366/84 |
| 5,096,302 |   | 3/1992 | Durina . |
| 5,106,198 | * | 4/1992 | Muller .................................... 366/83 |
| 5,156,794 | * | 10/1992 | Nakanishi et al. ..................... 366/84 |

FOREIGN PATENT DOCUMENTS

| 87102395 A | 10/1987 | (CN) . |
| 87102980 A | 12/1987 | (CN) . |
| 1040167 | 3/1990 | (CN) . |
| 0806280 A2 | 12/1997 | (EP) . |

OTHER PUBLICATIONS

Rubber Industry Handbook (1992) pp. 210–212.
Rubber Machinery Design (1984) pp. 307–309.

* cited by examiner

*Primary Examiner*—Charles E. Cooley
(74) *Attorney, Agent, or Firm*—Kilyk & Bowersox P.L.L.C.

(57) ABSTRACT

A feeding method and apparatus are provided for a extruder which is used for processing of rubber, plastic and cellulose etc. The feeding apparatus comprises an inlet, through which the materials enter the apparatus; a screw for transferring the materials from the inlet by rotating, which has helical flights and extends along the transfer direction of materials; a feeding roller at the inlet which has helical flights and extends along the transfer direction of materials. The helical flights of the screw and the helical flights of the roller are engaged untightly. The method comprises: providing a feeding roller at the inlet, the roller extending along the transfer direction of materials and having helical flights which mesh with the helical flights of the screw; making the helical flights of the roller engage the helical flights of the screw untightly; making the roller and the screw rotate in opposite directions when the extruder operates.

5 Claims, 2 Drawing Sheets

FEEDING APPARATUS AND METHOD IN SPIRAL ENGAGEMENT OF EXTRUDER

FIELD OF THE INVENTION

The invention relates to a feeding apparatus and method for the extruder which is used for processing rubber, plastic and cellulose etc. (including rubber plasticator, briquetting press, etc.), and in particular to a feeding apparatus and method in spiral engagement of extruder.

BACKGROUND OF THE INVENTION

The material was fed by gravity in the early extruders. Due to the backpressure at the outlet, this feeding method often led to material accumulation at the inlet when material was oversupplied and material slippage when material was undersupplied, resulting in low efficiency and low stability of the extruder. Thereafter, a new extruder was proposed which had a lateral pressure roller being provided at the inlet, and material was fed by means of this roller. This feeding method alleviated the problems of the material accumulation and slippage, however, due to the structure of the feeding apparatus, this method led to material leakage and material being forced into the bearings on both ends of the lateral pressure roller and thus failure of the roller. Although the currently used feeding method using a lateral pressure roller can improve the efficiency and stability of the extruder, the feeding apparatus has a high rate of failure, complicated structure and is difficult to manufacture. In order to overcome above drawbacks and improve the existing feeding method, the persons skilled in the art have proposed that the axial channels and spiral channels used in the feeding apparatus of plastic extruder be introduced into cold feed extruder, but no ideal results have been obtained therefrom. As a result, cold feed extruder still uses lateral pressure roller for the feeding of the material.

SUMMARY OF THE INVENTION

The object of the invention is to overcome the drawbacks of the feeding method and apparatus for the conventional extruder, and provide a feeding method and apparatus for extruder which is used for processing of rubber, plastic and cellulose. Based on the conventional feeding apparatus using a lateral pressure roller, the invention aims to design a feeding apparatus in spiral engagement to achieve the feeding method and apparatus in spiral engagement.

In order to achieve above object, there is provided a feeding method for extruder, the feeding apparatus of the extruder comprises: a cylinder having a material outlet and a material inlet formed thereon, the materials entering the feeding apparatus through the inlet; a screw received in the cylinder and extending along the transfer direction of the materials, the screw having helical flights and used to transfer the materials fed through the inlet by rotating along the cylinder, the method including the steps of:

providing at the inlet a feeding roller, which extends along the transfer direction of the materials and has helical flights which can mesh with the helical flights of the screw;

making the helical flights of the feeding roller engage with the helical flights of the screw untightly;

making the feeding roller and the screw rotate in opposite directions when the extruder operates, thereby the materials being forced into the gaps between the two helical flights under the action of the pressure produced by the helical flights on the feeding roller and entering the extruder under the action of helical flights on the screw.

According to another aspect of the invention, there is provided a feeding apparatus for extruder, the feeding apparatus comprises: a cylinder having a material outlet and a material inlet formed thereon, the materials entering the feeding apparatus through the inlet; a screw received in the cylinder and extending along the transfer direction of the materials, the screw having helical flights and used to transfer the materials fed through the inlet by rotating along said cylinder, the feeding apparatus further comprising a feeding roller provided at the inlet, which extends along the transfer direction of the materials and has helical flights, the helical flights on the feeding roller meshing with the helical flights on the screw untightly, and the feeding roller and the screw rotating in opposite direction when the extruder operates in order for the materials to be fed into the feeding apparatus and transferred.

Preferably, the two journals of the feeding roller are supported by two bearings mounted in the base of the feeding apparatus; the power input end of the feeding roller is provided with a power transmission gear; the feeding roller is covered by a closure for sealing the feeding roller; the base, closure and cylinder form a closed space for transferring materials.

Compared with the prior art, the inventive apparatus is easy to manufacture, has high efficiency and good stability, and especially, it can eliminate the drawback of high rate of failure present in the conventional feeding apparatus and method using lateral pressure roller.

BRIEF DESCRIPTION OF THE ACCOMPANYING DRAWINGS

The invention will be described in detail with reference to the accompanying drawings, in which FIG. 1 is a schematic view of the apparatus of the invention;

DETAILED DESCRIPTION OF THE PREFERRED EMBODIMENTS

Figure 3:
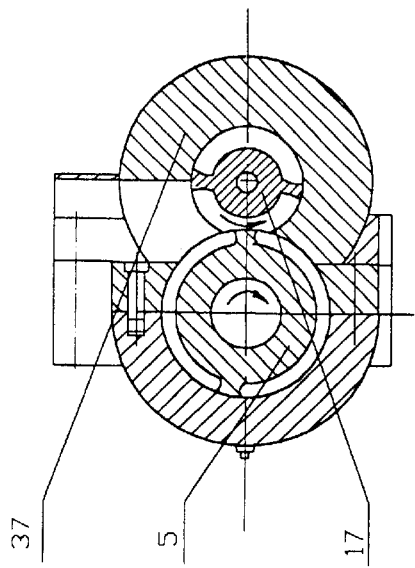
FIG. 3 is a cross-sectional view taken along line III—III in FIG. 1.
Figure 2:
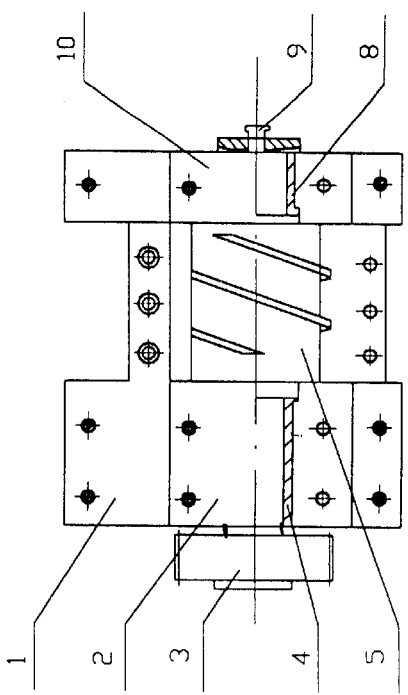
FIG. 2 is a partial cross-sectional view taken along line II—II in FIG. 1
Figure 1:
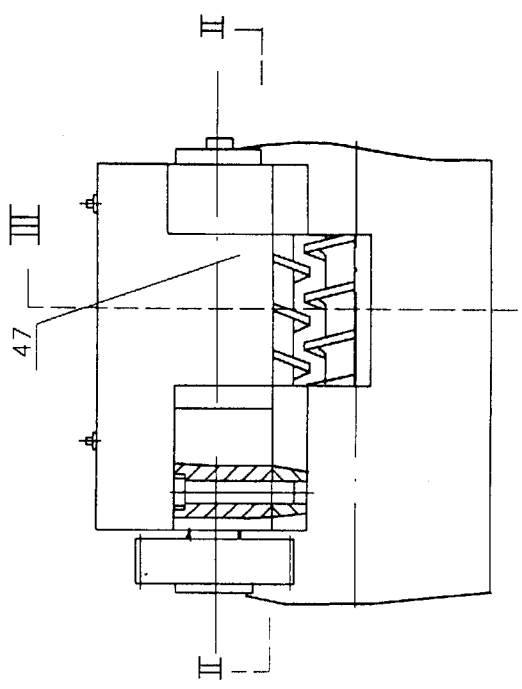

Reference is now made to FIGS. 1–4, the feeding apparatus of the invention comprises a screw 17, the screw is installed in a cylinder 37. On the cylinder 37 there are formed an outlet 15 and an inlet 13, the material to be transferred enters the apparatus through the inlet 13. The screw 17 is supported by bearings and rotated by the driving means of the extruder, and has helical flights 27 for transferring materials along the cylinder 37 by rotating. The feeding apparatus further comprises a feeding roller 5 provided at the inlet, extending along the transfer direction of materials. The journals of the roller 5 are respectively rotatably supported by left bearing 4 and right bearing 8 which are mounted in a base 1, the feeding roller 5 has helical flights 7. The shaft end of the feeding roller 5 outside the left bearing 4 is provided with a gear 3, which meshes with the driving gear of the extruder and makes the feeding roller 5 rotate when the extruder operates. The left and right bearings 4, 8 are covered by left and right closures 2, 10, which are used to prevent materials from entering these two bearings during extruding operation. In the right shaft end of the feeding roller 5 there are formed a channel 9 of cooling water. In the assembled state of the feeding apparatus, as shown in FIG. 1, helical flights 7 on the feeding roller 5 are engaged with the helical flights 27 on the screw untightly, the feeding roller 5 functions to strengthen the transfer of the materials along the cylinder. The feeding roller 5 is covered by a closure 47 for sealing the roller, and the closure may be integrated with the base 1. The base, closure and cylinder form a sealed space for transferring materials.

The term "untightly" and "loosely", as used herein, both describe the relationship between the flights on the feed roller and those on the screw. As shown in the drawing figures, particularly in FIGS. 1 and 4, the flights of the screw are not in contact with the flights of the feed roller so that material can enter the clearance between the two sets of flights and be delivered in an axial direction.

Figure 4:
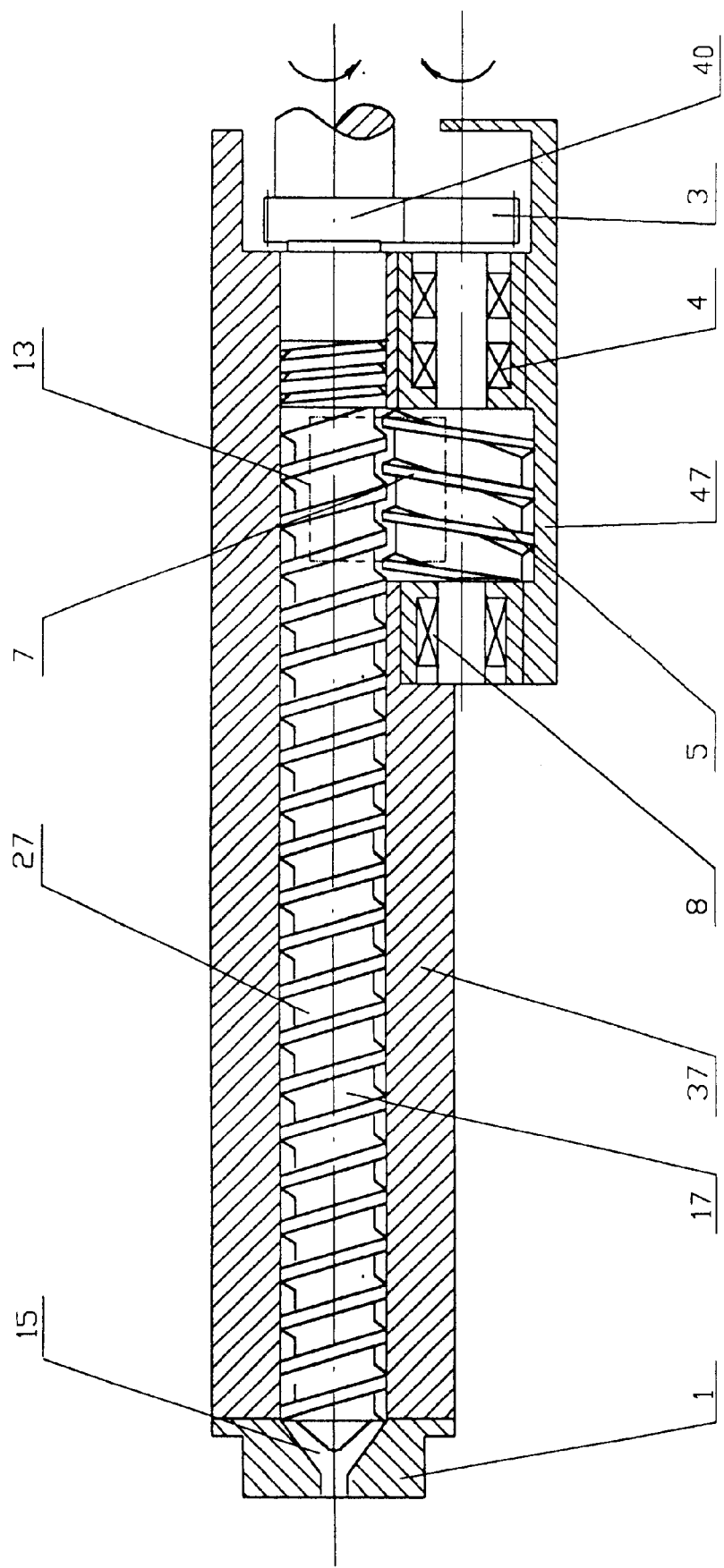
FIG. 4 is a view of the feeding apparatus of the invention, showing its principle.

As best seen in FIG. 4, the feeding roller 5 includes, along a portion of its axial length, helical flights 7. From FIG. 4, it can be seen that the axial length of the portion of feeding roller 5 that includes helical flights 7 is substantially equal to the length of the inlet 13 in an axial direction.

The operation of the feeding apparatus of the invention is now described. When the extruder operates, the feeding roller 5 and the screw 17 are rotated in opposite direction by the driving means while the materials is fed through the inlet. When rotating, the helical flights 7 on the feeding roller 5 produces the helical pressure, the materials is forced into the gaps between these two flights and then enters the extruder along the cylinder under the action of the helical flights of the screw 17,thus achieving the feeding of materials into the extruder.

Although the invention has been described in connection with the embodiment, those skilled in the art will appreciate that various modifications are possible without departing from the spirit and scope of the invention.

What is claimed is:

1. A feeding method for an extruder of a single screw type that includes a feeding apparatus said feeding apparatus comprising: a cylinder having a material outlet and a material inlet formed thereon, wherein materials enter the feeding apparatus through the inlet; a screw received in the cylinder and extending along a transfer direction of the materials, said screw having helical flights for transferring materials fed from the inlet by rotating along said cylinder, said method including the steps of:

providing at the inlet a cylindrical feeding roller, which extends along the transfer direction of the materials, has feeding roller helical flights which can mesh with the helical flights of the screw, has a portion along its axial length having said feeding roller helical flights, and has two journals, said feeding roller being located adjacent the inlet, the axial length of the portion of the feeding roller having said feeding roller helical flights being substantially equal to the length of the inlet in the axial direction of the feeding apparatus, and the two journals of the feeding roller being supported by two bearings mounted in a base;

loosely engaging the helical flights of the feeding roller with the helical flights of the screw; and rotating the feeding roller and the screw in opposite directions to move materials from said inlet down said screw in the transfer direction.

2. The feeding method of claim 1, wherein a power input end of the feeding roller is provided with a power transmission gear; the feeding roller is covered by a closure for sealing the feeding roller, and said base, said closure, and said cylinder form a closed space for transferring materials.

3. A feeding apparatus for an extruder of a single screw type, said feeding apparatus comprising: a cylinder having a material outlet and a material inlet formed thereon, wherein material enters the feeding apparatus through the inlet; a screw received in the cylinder and extending along the transfer direction of the materials, said screw having helical flights and used to transfer materials fed through the inlet by rotating along said cylinder, wherein said feeding apparatus further comprises a cylindrical feeding roller provided at the inlet, which extends along the transfer direction of the materials, has feeding roller helical flights, has a portion along its axial length having said feeding roller helical flights, and has two journals, said feeding roller being located adjacent the inlet, the axial length of the portion of the feeding roller having said feeding roller helical flights being substantially equal to the length of the inlet in the axial direction of the feeding apparatus, and the two journals of the feeding roller being supported by two bearings mounted in a base; the helical flights on the feeding roller loosely meshing with the helical flights on the screw, and said feeding roller and said screw rotating in opposite directions when the extruder operates.

4. The feeding apparatus of claim 3, wherein a power input end of the feeding roller is provided with a power transmission gear; the feeding roller is covered by a closure for sealing the feeding roller, and said base, said closure, and said cylinder form a closed space for transferring materials.

5. The feeding apparatus of claim 4, wherein said closure is integrated with the base.

* * * * *